(12) United States Patent
Chen et al.

(10) Patent No.: US 11,435,932 B1
(45) Date of Patent: Sep. 6, 2022

(54) DATA RELOCATION SYSTEM

(71) Applicant: Dell Products L.P., Round Rock, TX (US)

(72) Inventors: Chi Chen, Chengdu (CN); Hailan Dong, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/236,307

(22) Filed: Apr. 21, 2021

(30) Foreign Application Priority Data

Mar. 24, 2021 (CN) .......................... 202110316756.7

(51) Int. Cl.
*G06F 12/00* (2006.01)
*G06F 3/06* (2006.01)

(52) U.S. Cl.
CPC .......... *G06F 3/0647* (2013.01); *G06F 3/0611* (2013.01); *G06F 3/0653* (2013.01); *G06F 3/0673* (2013.01); *G06F 3/0683* (2013.01)

(58) Field of Classification Search
CPC .... G06F 3/0647; G06F 3/0611; G06F 3/0653; G06F 3/0673; G06F 3/0683
See application file for complete search history.

(56) References Cited

U.S. PATENT DOCUMENTS

| | | | | |
|---|---|---|---|---|
| 7,257,684 B1 * | 8/2007 | Sinha | .................... | G06F 3/0616 |
| | | | | 711/165 |
| 10,671,309 B1 * | 6/2020 | Glynn | .................. | G06F 3/0683 |
| 10,754,574 B1 * | 8/2020 | Jo | .......................... | G06F 3/0619 |
| 2012/0239859 A1 * | 9/2012 | Lary | ..................... | G06F 3/0685 |
| | | | | 711/E12.019 |
| 2014/0297940 A1 * | 10/2014 | Kobayashi | .......... | G06F 12/0866 |
| | | | | 711/113 |
| 2014/0359215 A1 * | 12/2014 | Ogihara | ................ | G06F 3/0685 |
| | | | | 711/114 |
| 2020/0034040 A1 * | 1/2020 | Garman | ................ | G06F 3/0611 |

\* cited by examiner

*Primary Examiner* — John A Lane
(74) *Attorney, Agent, or Firm* — Joseph Mencher

(57) ABSTRACT

A data relocation system includes a storage controller device coupled to first storage device(s) that operate at first data access speeds, and second storage device(s) that operate at second data access speeds that are higher than the first data access speeds. During a first time period, the storage controller device monitors first data that is stored in the first storage device(s) to identify a first data access frequency for the first data, and determines that the first data access frequency for the first data during the first time period indicates that a second data access frequency for the first data will exceed a data access frequency threshold during a second time period that occurs immediately following the first time period. In response and during the second time period, the storage controller device relocates the first data from the first storage device(s) to the second storage device(s).

20 Claims, 13 Drawing Sheets

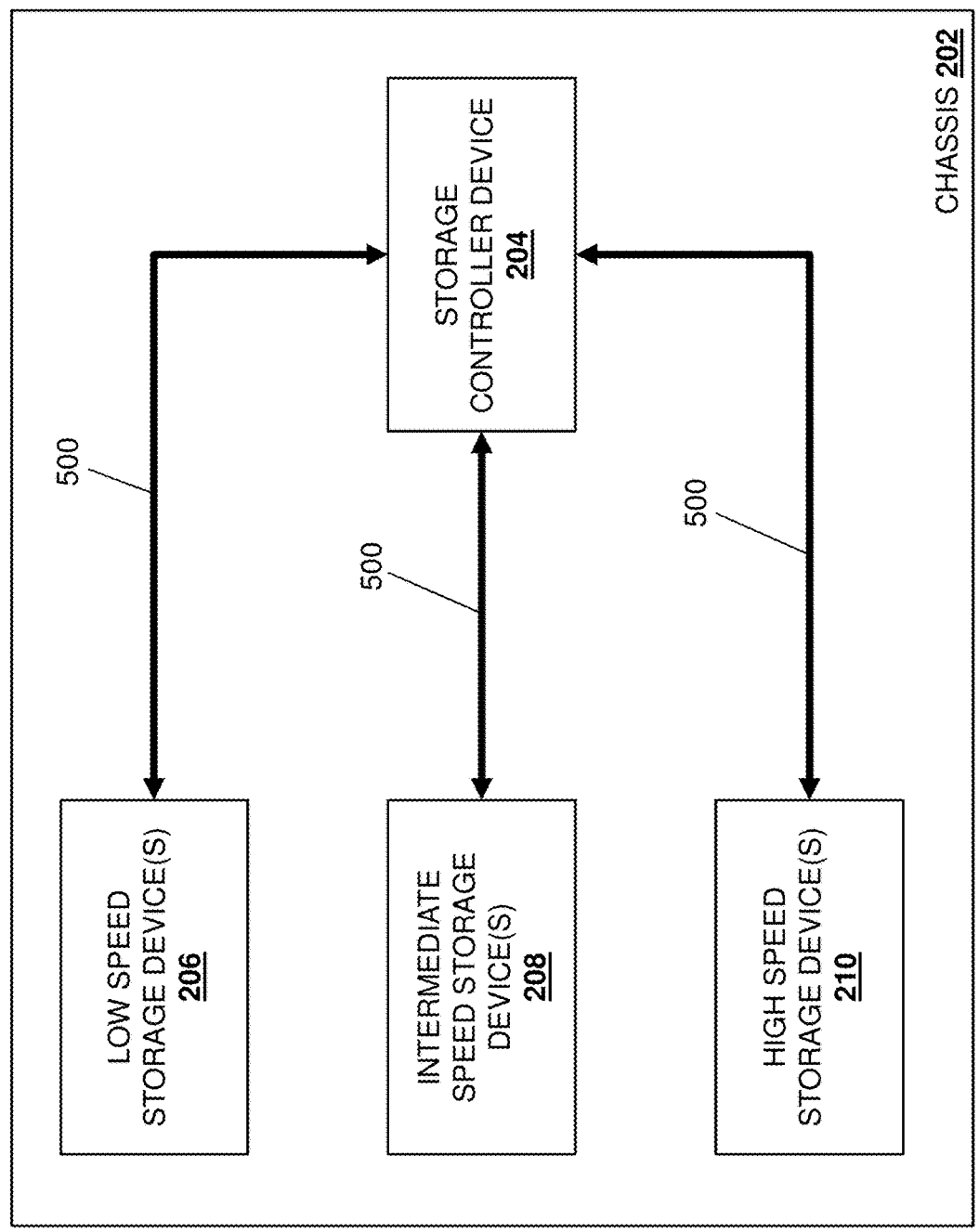

DATA RELOCATION SYSTEM

CROSS-REFERENCE TO RELATED APPLICATIONS

This application claims priority to Chinese Patent Application Serial No. 202110316756.7, filed on Mar. 24, 2021, the disclosure of which is incorporated herein by reference in its entirety.

BACKGROUND

The present disclosure relates generally to information handling systems, and more particularly to the relocation of data in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, storage systems, are often utilized by other information handling systems such as, for example, server devices, in order to store and retrieve data. Furthermore, storage systems often include storage devices with different storage capabilities, including relatively low speed Hard Disk Drive (HHD) storage devices such as "Near Line" Serial Attached Small Computer System Interface (SCSI) (SAS) storage devices that provide relatively slow data storage and/or retrieval times, relatively intermediate speed Hard Disk Drive (HHD) storage devices such as 10k or 15k hard disk rotational speed SAS storage devices that provide relatively intermediate data storage and/or retrieval times, and relatively high speed Solid-State Drive (SSD) storage devices such as flash storage devices that provide relatively fast data storage and/or retrieval times. "Fully Automated Storage Tiering for Virtual Pools (FAST-VP)" systems have been developed for such storage systems in order to provide for the more efficient storage and/or retrieval of data using the storage devices having different performance, and operate to dynamically relocate data amongst the storage devices based on how frequently it is accessed, with more frequently accessed data relocated to relatively higher speed storage devices, and less frequently accessed data relocated to relatively lower speed storage devices.

However, conventional FAST-VP systems operate to relocate all data that is subject to relocation at a fixed time, which can raise several issues. For example, the inventors of the present disclosure have discovered that such fixed time data relocation operations do not take into account the differing data access patterns of different data, which can result in particular data that has recently been relocated to relatively high speed storage device(s) (e.g., due to a previously identified relatively high data access frequency for that data) being subject to a relatively low data access frequency, or can result in any particular data that has recently been relocated to relatively low speed storage device(s) (e.g., due to a previously identified relatively low data access frequency for that data) being subject to a relatively high data access frequency, thus reducing the efficiency of data relocation operations. Furthermore, the relocation of all the data at a fixed time is problematic in datacenters with a global user base, as time windows may not exist during which data relocation operations may be performed without interrupting data access for some relatively significant number of users. Further still, the fixed time data relocation operations can create an internal I/O load peak (also called a "relocation workload pulse") due to the need to move a relatively large amount of data within the storage system as part of the data relocation operations, which can affect data access for some relatively significant number of users as well.

Accordingly, it would be desirable to provide a data relocation system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a data relocation engine that is configured to: monitor, during a first time period, first data that is stored in at least one first storage device that is configured to operate at first data access speeds to identify a first data access frequency for the first data; determine that the first data access frequency for the first data during the first time period indicates that a second data access frequency for the first data will exceed a data access frequency threshold during a second time period that occurs immediately following the first time period; and relocate, during the second time period and in response to determining the first data access frequency for the first data during the first time period indicates that the second data access frequency for the first data will exceed the data access frequency threshold during the second time period that occurs immediately following the first time period, the first data from the at least one first storage device to at least one second storage device that is configured to operate at second data access speeds that are higher than the first data access speeds.

BRIEF DESCRIPTION OF THE DRAWINGS

FIG. 5A is a schematic view illustrating an embodiment of the operation of the storage system of FIG. 2 during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
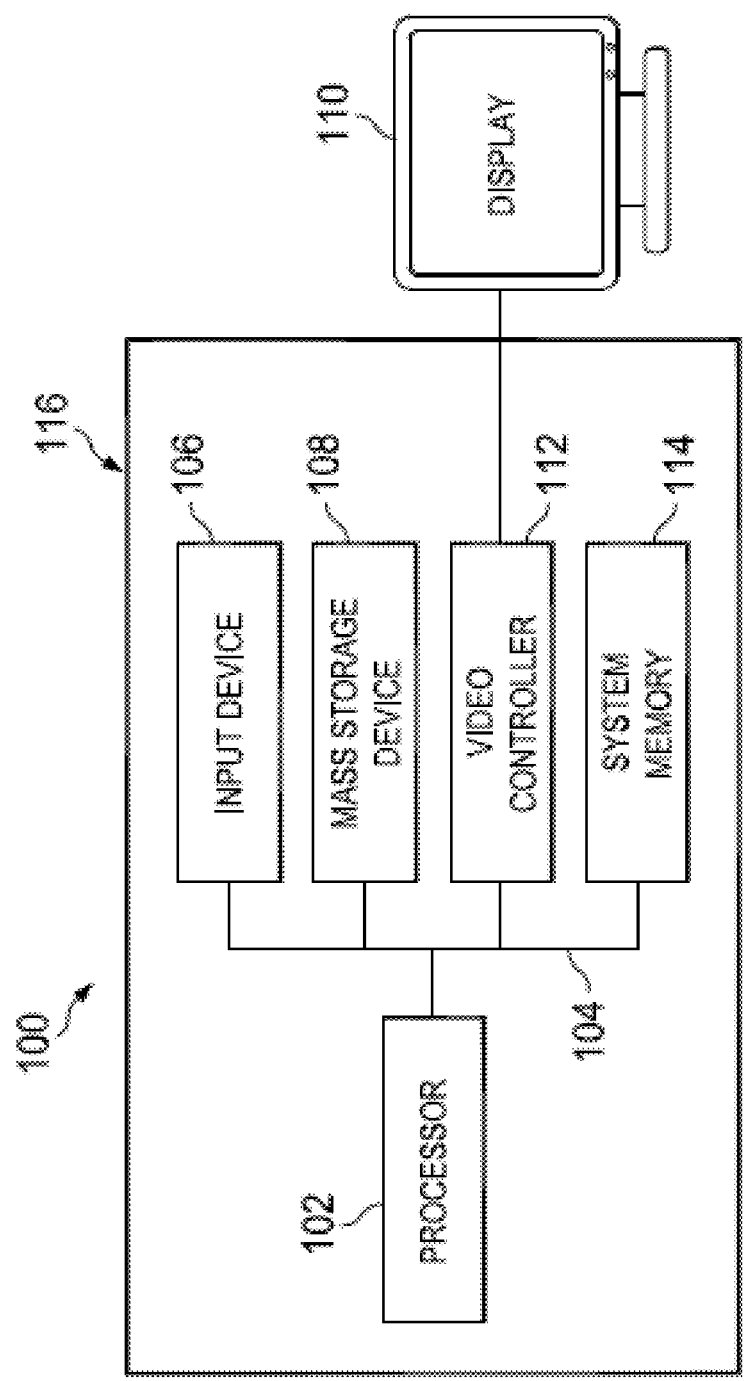
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
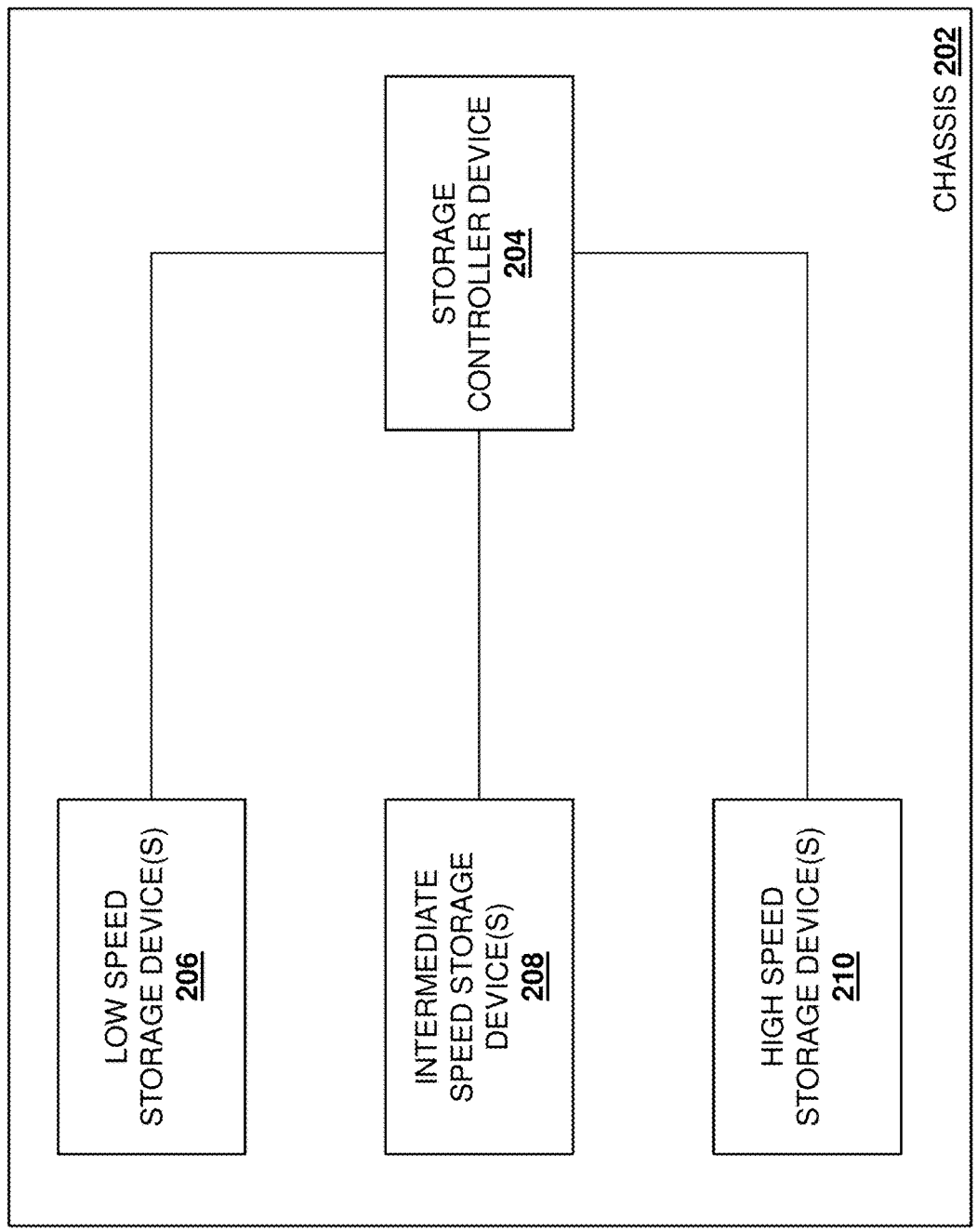
FIG. 2 is a schematic view illustrating an embodiment of a storage system that may utilize the data relocation system of the present disclosure.

Referring now to FIG. 2, an embodiment of a storage system 200 is illustrated that may utilize the data relocation system of the present disclosure. For example, the storage system 200 may implement a Fully Automated Storage Tiering for Virtual Pools (FAST-VP) system that includes the data relocation system (e.g., a FAST-VP data relocation system) of the present disclosure. However, while a specific data relocation system is described, one of skill in the art in possession of the present disclosure will appreciate that the data relocation functionality of the present disclosure may be implanted in storage systems in other manners that will fall within the scope of the present disclosure as well. In the illustrated embodiment, the storage system 200 includes a chassis 202 that may be provided by a storage rack or other storage enclosures known in the art. In the illustrated embodiment, a storage controller device 204 is included in the chassis 202. In an embodiment, the storage controller device 204 may be provided by the IHS 100 discussed above with reference to FIG. 1, and/or may include some or all of the components of the IHS 100. However, while illustrated and discussed as being provided by a storage controller device, one of skill in the art in possession of the present disclosure will recognize that the storage controller device 204 provided in the system 200 may be replaced by any devices that may be configured to operate similarly as the storage controller device 204 discussed below.

In the illustrated embodiment, the storage system 200 includes one or more relatively low speed storage devices 206 that are coupled to the storage controller device 204 and that may be provided by relatively low speed HDD storage devices such as "Near Line" SAS storage devices that provide relatively slow data access (e.g., storage and/or retrieval) speeds, one or more relatively intermediate speed storage device 208 that are coupled to the storage controller device 204 and that may be provided by relatively intermediate speed HDD storage devices such as 10k or 15k hard disk rotational speed SAS storage devices that provide relatively intermediate data access (e.g., storage and/or retrieval) speeds, and one or more relatively high speed storage devices 210 that may be provided by relatively high speed SSD storage devices such as flash storage devices that provide relatively fast data access (e.g., storage and/or retrieval) speeds. However, while three performance tiers of storage devices are described herein, one of skill in the art in possession of the present disclosure will appreciate that different numbers of performance tiers of storage devices will fall within the scope of the present disclosure as well.

Furthermore, while specific storage devices are illustrated and described in the examples provide herein, one of skill in the art in possession of the present disclosure will recognize that the storage system 200 may include a variety of different types of relatively low speed storage device(s) with relatively low data access (e.g., storage and/or retrieval) speeds, a variety of different types of relatively intermediate speed storage device(s) with relatively intermediate data access (e.g., storage and/or retrieval) speeds, and a variety of different types of relatively high speed storage device(s) with relatively high data access (e.g., storage and/or retrieval) speeds. As such, the relatively low speed storage device(s) 206 and relatively intermediate speed storage device(s) 208 (e.g., HDD storage devices) discussed below that include relatively low speed and intermediate speed data access (e.g., storage and/or retrieval) speeds may be replaced by other types of storage devices, and the relatively high speed storage device(s) 210 (e.g., SDD/flash storage devices) discussed below that include relatively high data access (e.g., storage and/or retrieval) speeds may be replaced by other types of storage devices (e.g., other flash storage devices, etc.) while remaining within the scope of the present disclosure as well. Furthermore, while a specific storage system 200 has been illustrated and described, one of skill in the art in possession of the present disclosure will recognize that the storage system of the present disclosure may include a variety of components and component configurations while remaining within the scope of the present disclosure as well.

Figure 3:
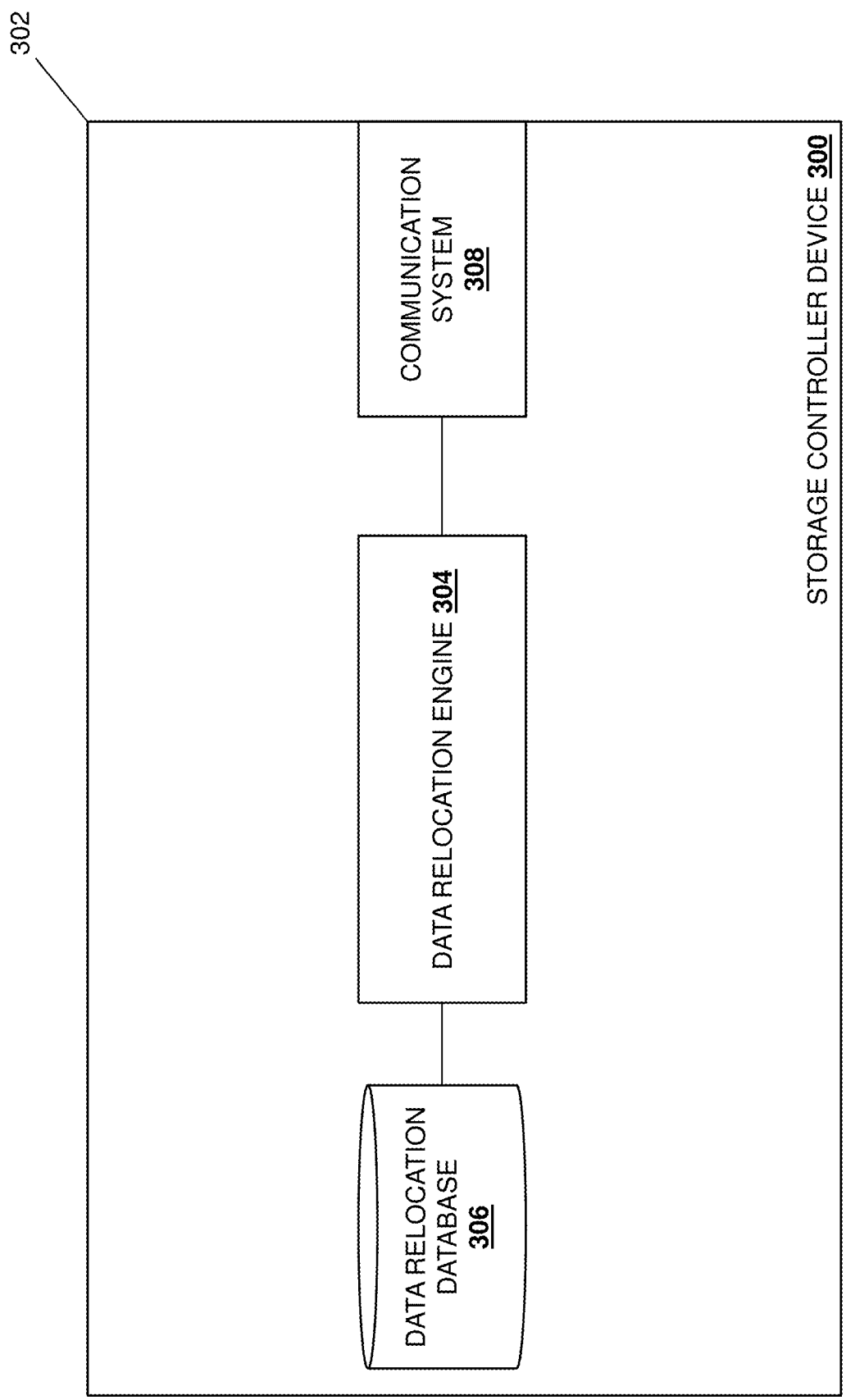
FIG. 3 is a schematic view illustrating an embodiment of a storage controller device that may be included in the storage system of FIG. 2.

Referring now to FIG. 3, an embodiment of a storage controller device 300 is illustrated that may provide the storage controller device 204 discussed above with reference to FIG. 2. As such, the storage controller device 300 may be provided by the IHS 100 discussed above with reference to FIG. 1 and/or may include some or all of the components of the IHS 100. Furthermore, while illustrated and discussed as being provided by a storage controller device, one of skill in the art in possession of the present disclosure will recognize that the functionality of the storage controller device 300 discussed below may be provided by other devices that are configured to operate similarly as the storage controller device 300 discussed below. In the illustrated embodiment, the storage controller device 300 includes a chassis 302 (e.g., an enclosure, a circuit board, etc.) that houses or supports the components of the storage controller device 300, only some of which are illustrated below. For example, the chassis 302 may house or support a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a data relocation engine 304 that is configured to perform the functionality of the data relocation engines and/or storage controller devices discussed below.

The chassis 302 may also house a storage system (not illustrated, but which may include the storage 108 discussed above with reference to FIG. 1) that is coupled to the data relocation engine 304 (e.g., via a coupling between the storage system and the processing system) and that includes a data relocation database 306 that is configured to store any of the information utilized by the data relocation engine 304 discussed below. The chassis 302 may also house a communication system 308 that is coupled to the data relocation engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would one of skill in the art in possession of the present disclosure would recognize as providing for the coupling of the data relocation engine 304 to the storage devices 206, 208, and 210. However, while a specific storage controller device 300 has been illustrated, one of skill in the art in possession of the present disclosure will recognize that storage controller devices (or other devices operating according to the teachings of the present disclosure in a manner similar to that described below for the storage controller device 300) may include a variety of components and/or component configurations for providing conventional storage controller device functionality, as well as the functionality discussed below, while remaining within the scope of the present disclosure as well.

Figure 4:
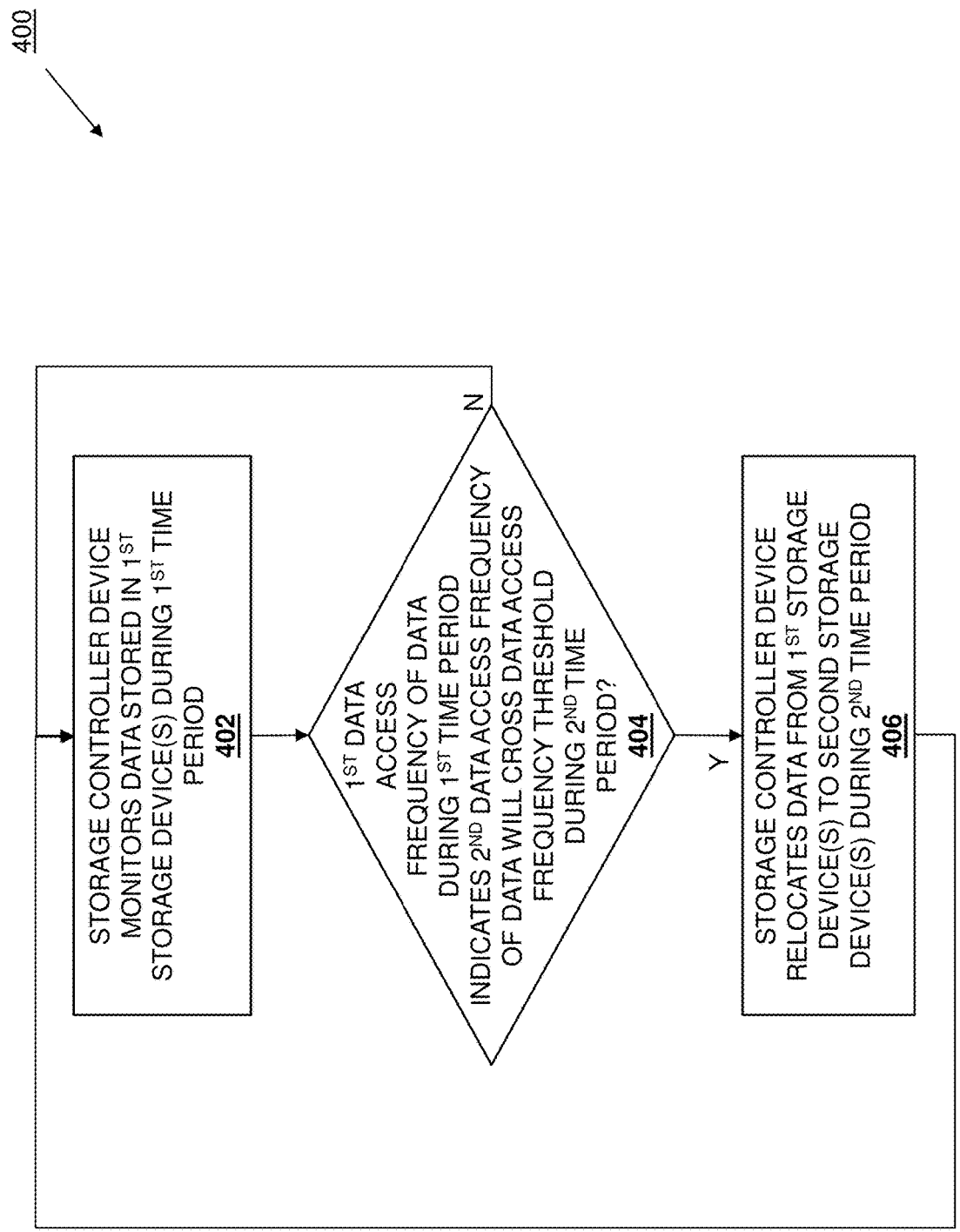
FIG. 4 is a flow chart illustrating an embodiment of a method for relocating data.
Figure 5B:
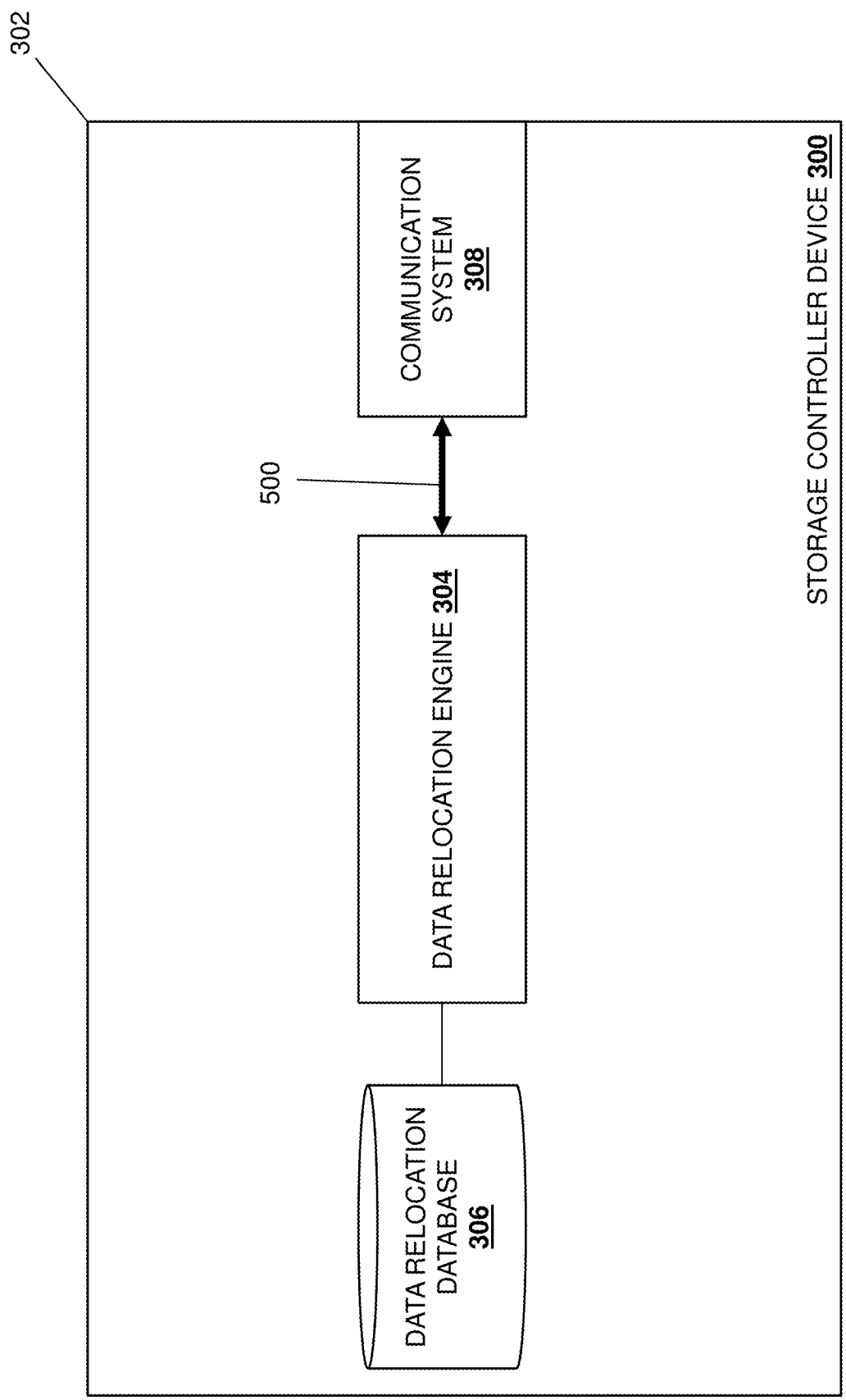
FIG. 5B is a schematic view illustrating an embodiment of the operation of the storage controller device of FIG. 3 during the method of FIG. 4.

Referring now to FIG. 4, an embodiment of a method 400 for relocating data is illustrated. As discussed below, the systems and methods of the present disclosure provide for the relocation of any particular data in response to detecting that the data access frequency of that particular data is about to cross a data access frequency threshold. For example, the data relocation system of the present disclosure may include a storage controller device coupled to first storage device(s) that operate at first data access speeds, and second storage device(s) that operate at second data access speeds that are higher than the first data access speeds. During a first time period, the storage controller device monitors first data that is stored in the first storage device(s) to identify a first data access frequency for the first data, and determines that the first data access frequency for the first data during the first time period indicates that a second data access frequency for the first data will exceed a data access frequency threshold during a second time period that occurs immediately following the first time period. In response and during the second time period, the storage controller device relocates the first data from the first storage device(s) to the second storage device(s). As such, the systems and methods of the present disclosure operate to relocate different data at different times, with any particular data relocated when its data access frequency is about to cross a data access frequency threshold, which operates to increase the efficiency of data relocation operations, prevent the interruption of data access for users in datacenters with a global user base, prevent internal I/O load peaks/relocation workload pulses that would otherwise affect data access for users, and provide other benefits that would be apparent to one of skill in the art in possession of the present disclosure.

The method 400 begins at block 402 where a storage controller device monitors data stored in first storage device(s) during a first time period. In an embodiment, at block 402, the data relocation engine 304 in the storage controller device 300 may perform data monitoring operations 500 that may include monitoring, via its communication system 308, data blocks, data chunks, data slices, and/or any other data structures stored in any or all of the low speed storage device(s) 206, the intermediate speed storage device(s) 208, and the high speed storage device(s) 210. In a specific example, the different data monitored at block 402 during the method 400 each be stored in the storage system 200 as 256 MB data slices, although one of skill in the art in possession of the present disclosure will recognize that data may be stored in different sizes and/or configurations while remaining within the scope of the present disclosure as well. As will be appreciated by one of skill in the art in possession of the present disclosure, the monitoring of the data at block 402 may include the monitoring of the data access operations (e.g., data retrieval operations) performed to access any particular data stored in the low speed storage device(s) 206, the intermediate speed storage device(s) 208, and the high-speed storage device(s) 210.

Figure 6:
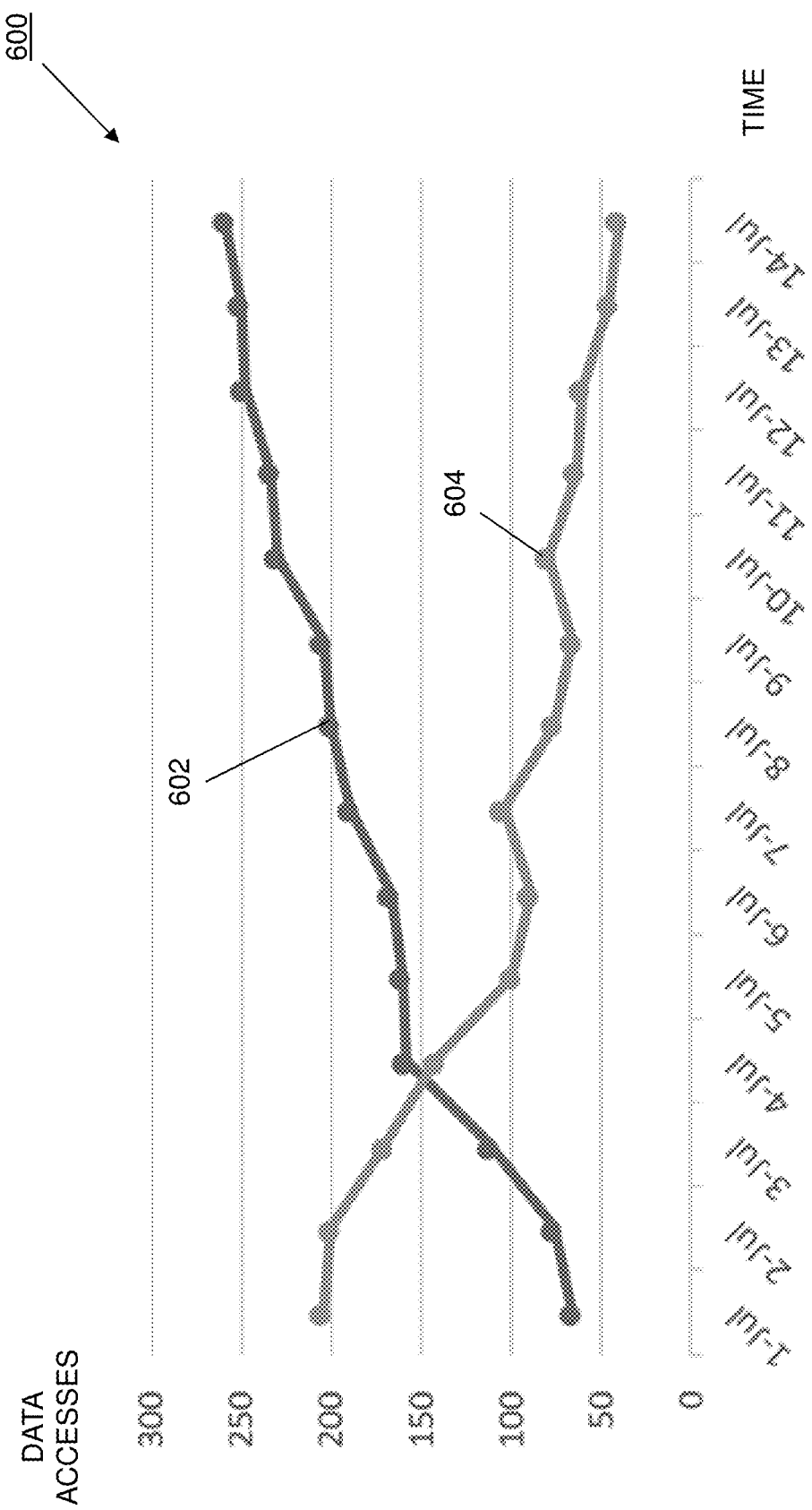
FIG. 6 is a graph view illustrating an embodiment of trend-based data access patterns.

As will be appreciated by one of skill in the art in possession of the present disclosure, data access frequencies for data in the storage system 200 may follow data access patterns over time, with different types of data that is associated with data access frequencies exhibiting different data access patterns. The inventors of the present disclosure describe techniques for detecting data access patterns in U.S. patent application Ser. No. 16/884,265, filed on May 27, 2020, the disclosure of which is incorporated by reference herein in its entirety. With reference to FIG. 6, an example of trend-based data access patterns 600 are illustrated that show how data 602 may be accessed over time (e.g., over 14 days in the illustrated example) in a manner that provides a relatively long term increasing trend-based data access pattern, and how data 604 may be accessed over time (e.g., over 14 days in the illustrated example) in a manner that provides a relatively long term decreasing trend-based data access pattern.

Figure 7:
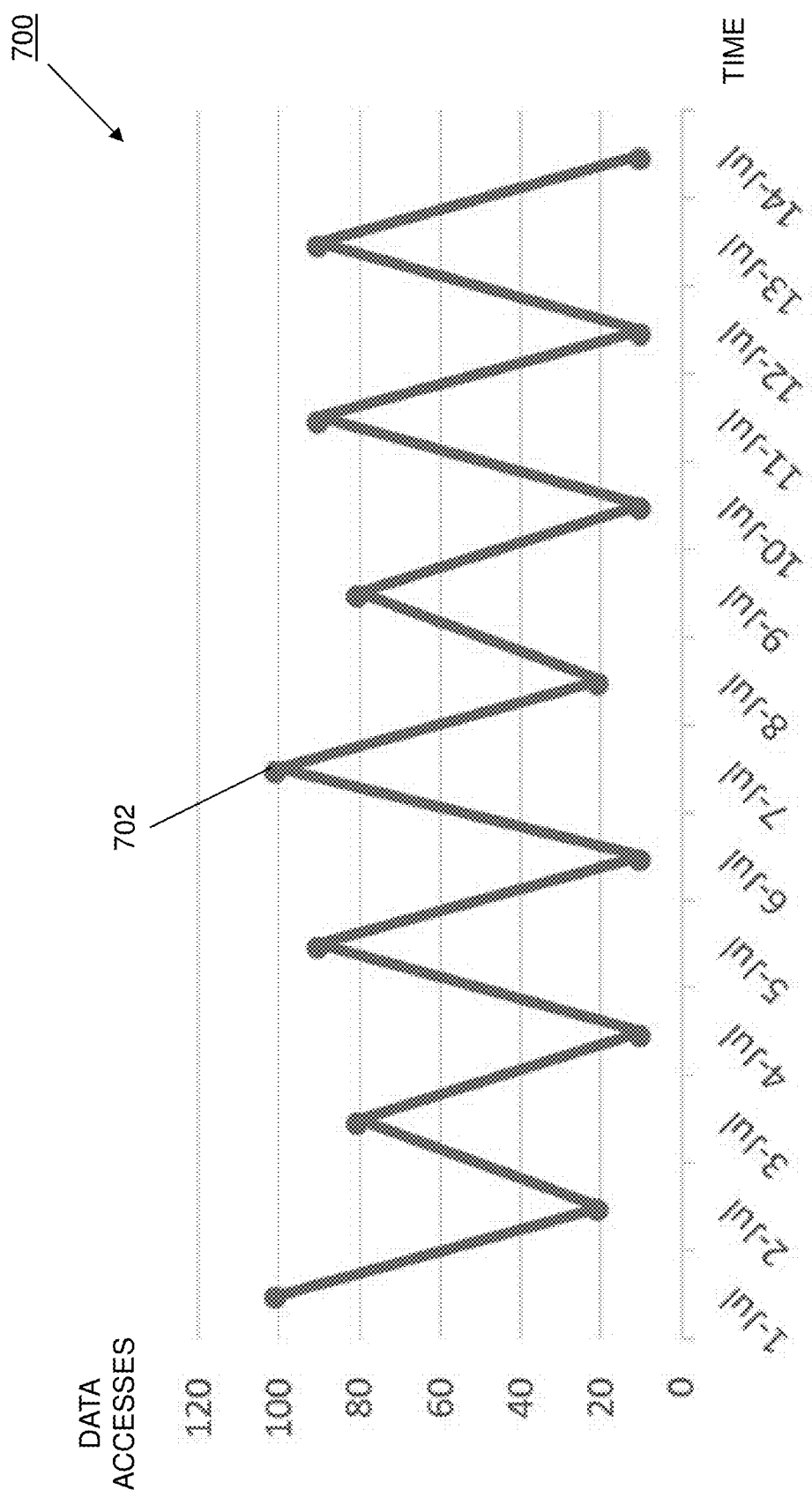
FIG. 7 is a graph view illustrating an embodiment of a cyclic data access pattern.
Figure 8:
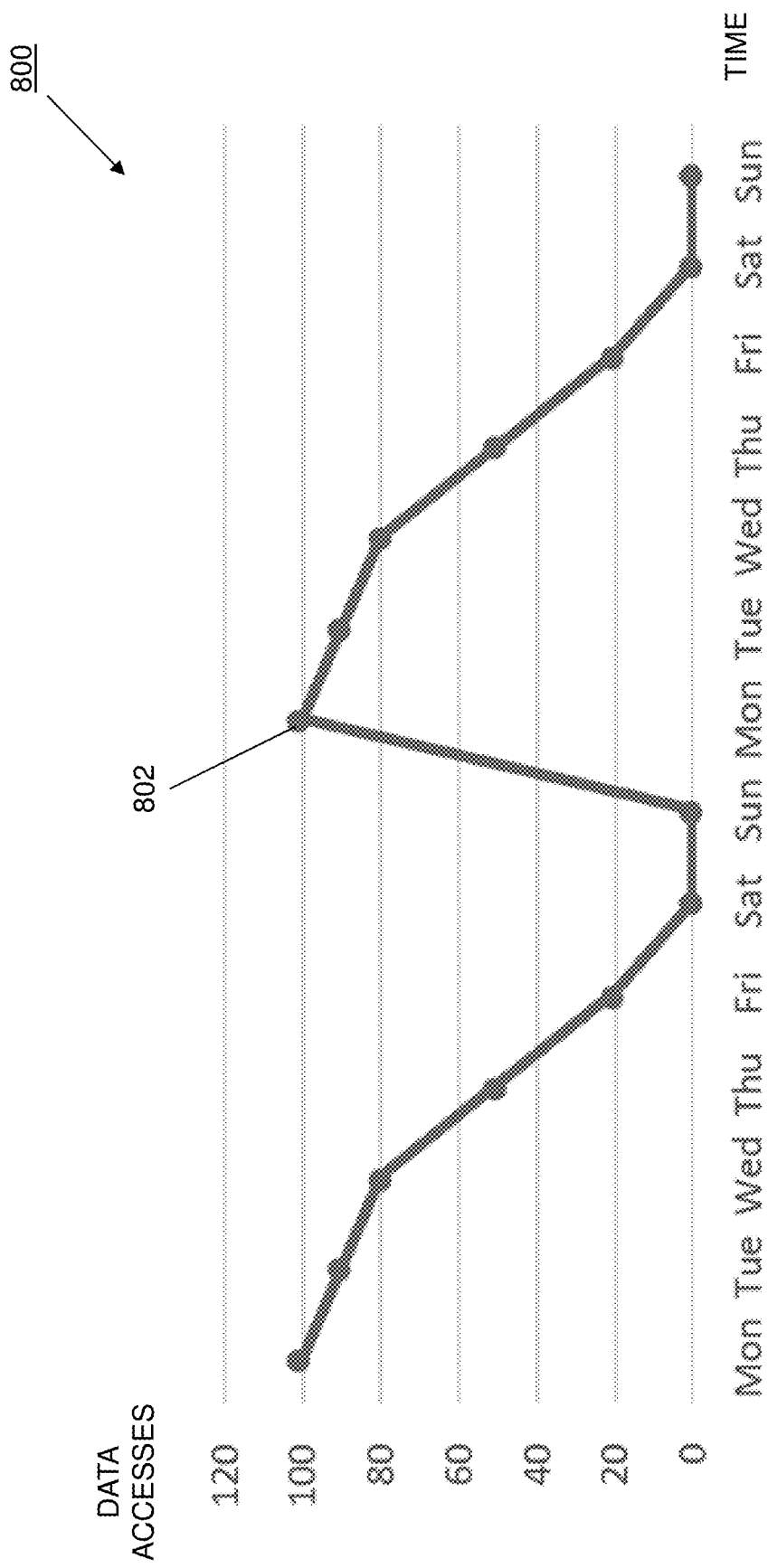
FIG. 8 is a graph view illustrating an embodiment of a seasonal data access pattern.

With reference to FIG. 7, an example of cyclic data access pattern 700 is illustrated that shows how data 702 may be accessed over time (e.g., over 14 days in the illustrated example) in a manner that provides a cyclic data access pattern that cycles between relatively high data accesses (e.g., 80 or more in the illustrated example) and relatively low data accesses (e.g., 20 or less in the illustrated example) on adjacent days. With reference to FIG. 8, an example of a seasonal data access pattern 800 is illustrated that shows how data 802 may be accessed over time (e.g., over 14 days in the illustrated example) in a manner that provides a seasonal data access pattern that repeats each week with relatively high data accesses (e.g., 80 or more in the illustrated example) during the beginning of the week (e.g., Monday through Wednesday in the illustrated example), and relatively low data accesses (e.g., 55 or less in the illustrated example) during the end of the week (e.g., Thursday and Friday in the illustrated example), with no data accesses on the weekend. However, while the seasonal data access pattern 800 is illustrated and described as a weekly data access pattern, one of skill in the art in possession of the present disclosure will appreciate how other seasonal data access patterns (e.g., daily, monthly, yearly) will fall within the scope of the present disclosure as well.

Figure 9:
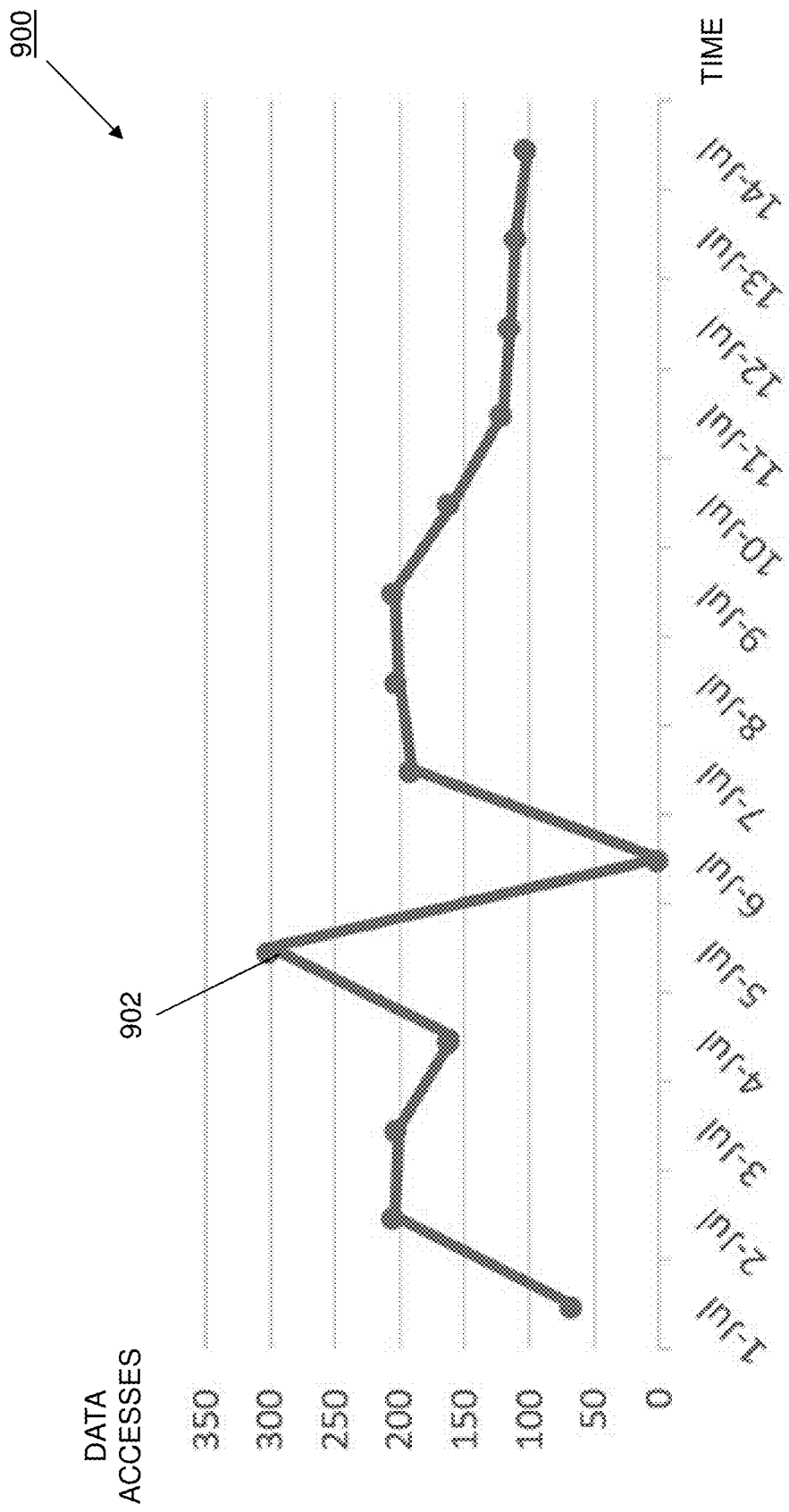
FIG. 9 is a graph view illustrating an embodiment of an irregular data access pattern.

With reference to FIG. 9, an example of an irregular data access pattern 900 is illustrated that shows how data 902 may be accessed irregularly over time (e.g., over 14 days in the illustrated example) in a manner that provides an irregular data access pattern that shows no repeating pattern (i.e., as opposed to the trend-based data access patterns 600, cyclic data access pattern 700, and seasonal data access pattern 800 discussed above) due to the data access for the data 902 changing randomly and/or in an unpredictable manner. As will be appreciated by one of skill in the art in possession of the present disclosure, the data relocation techniques described herein may function more efficiently and provide enhanced benefits for data with a repeating data access pattern (i.e., like the trend-based data access patterns 600, cyclic data access pattern 700, and seasonal data access pattern 800 discussed above). However, one of skill in the art in possession of the present disclosure will also recognize that the data relocation techniques described herein may provide some benefits for data without a repeating data access pattern (e.g., like the irregular data access pattern 900 discussed above), and thus its use with data accessed in such a manner will fall within the scope of the present disclosure as well. Furthermore, while several specific data access patterns have been described, one of skill in the art in possession of the present disclosure will appreciate that other data access patterns for data exist, and the use of the data relocation system of the present disclosure with that data will fall within the scope of the present disclosure as well.

The method 400 then proceeds to decision block 404 where it is determined whether a first data access frequency of the data during the first time period indicates that a second data access frequency of the data will cross a data access frequency threshold during the second time period. In an embodiment, at decision block 404 and based on the data monitoring operations 500, the data relocation engine 304 in the storage controller device 300 may operate to determine whether a data access frequency that is identified in a first time period based on the data monitoring operations 500 performed for any particular data indicates that a second access frequency of that particular data will cross a data access frequency threshold during a second time period that immediately follows the first time period. In some embodiments, the determination performed at decision block 404 may be based on an autocorrelation function that is configured for periodicity detection. As would be apparent to one of skill in the art in possession of the present disclosure, autocorrelation (also known as serial correlation) provides for the correlation of a signal with a delayed copy of that signal as a function of the delay. In other words, autocorrelation provides for the identification of a similarity of observed signals as a function of the time period between those signals. As will be appreciated by one of skill in the art in possession of the present disclosure, autocorrelation analysis provides a mathematical tool for identifying a repeating pattern, and conventionally has been used to identify the presence of a signal obscured by noise, to identify a missing fundamental frequency in a signal implied by its harmonic frequency, and in other signal processing situations to analyze functions or a series of values (e.g., time domain signals).

In a specific example, an autocorrelation function ACF(k) may utilized at block 404 to detect periodicity in the data access frequency monitored for any particular data at block 402, and provides a fraction of a total variance due to correlated values at lag k time steps:

$$ACF(k) = r_k = \sum_{t=k+1}^{T}(y_t - \bar{y})(y_{t-k} - \bar{y}) \Big/ \sum_{t=1}^{T}(y_t - \bar{y})^2$$

Figure 10A:
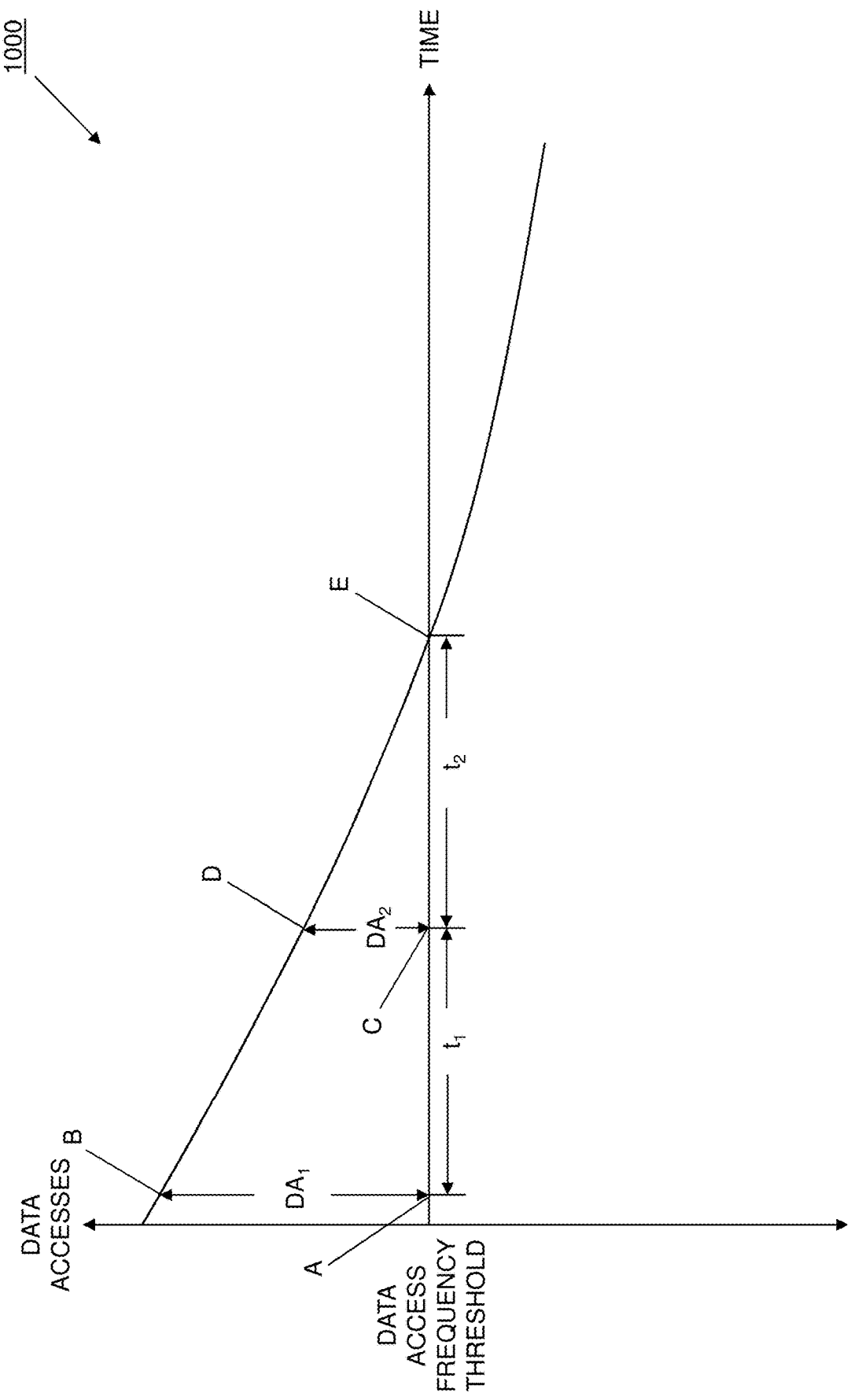
FIG. 10A is a graph view illustrating an embodiment of data access crossing a data access frequency threshold.

With reference to FIG. 10A, a data access frequency graph 1000 for particular data is illustrated to provide an example of a situation where the data access frequency for that particular data is initially above a data access frequency threshold, and then falls below the data access frequency threshold. As can be seen in FIG. 10A, at a first time A the particular data experienced a number of data accesses $DA_1$ that is above the data access frequency threshold and that is marked on the data access plot at point B, and at a second time C that is a time period $t_1$ following the first time A, the particular data experiences a number of data accesses $DA_2$ that is above the data access frequency threshold and that is marked on the data access plot at point D. Furthermore, at a third time E that is a time period $t_2$ following the second time C, the particular data will experience a number of data accesses that is defined by the data access frequency threshold, and following the third time E, the data access frequency of the particular data will be below the data access frequency threshold.

As will be appreciated by one of skill in the art in possession of the present disclosure, the number of data accesses $DA_1$ may have been identified by monitoring of the particular data at the first time A, and the number of data accesses $DA_2$ may be identified by the monitoring of the particular data at the second time B that is a known time period $t_1$ (e.g., 1 hour in the specific examples below). The time period $t_2$ then provides the amount of time following the second time B at which the number of data accesses for the particular data will fall below the data access frequency threshold, and can be solved for using the following equation by assuming that the first time A, the third time E, and point B on the data access plot of FIG. 10A form a triangle AEB that is similar a triangle CED formed by the second time C, the third time E, and point D on the data access plot of FIG. 10A:

$$t_2/DA_2=(t_1+t_2)/DA_1$$

Using 1-hour for the time period $t_1$, the equation above may be solved for the time period $t_2$:

$$t_2=DA_2/(DA_1-DA_2)$$

As such, when the time period $t_2$ is less than 1 hour, the number of data accesses for the particular data will fall below the data access frequency threshold in a subsequent time period (e.g., using 1-hour time periods in this example). In other words, at a current time C and following a current time period $t_1$, the time period $t_2$ that will be required for the number of data accesses for any particular data to fall below the data access frequency threshold may be determined. Thus, the data relocation engine 304 in the storage controller device 300 may utilize the equation above at decision block 404 to determine whether the number of data accesses $DA_2$ that are identified at the second time C for any particular data indicates that the number of data accesses of that particular data at the third time E will fall below the data access frequency threshold during the subsequent time period (e.g., 1 hour in this example) that immediately follows the time period $t_1$ (e.g., also 1 hour in this example).

Figure 10B:
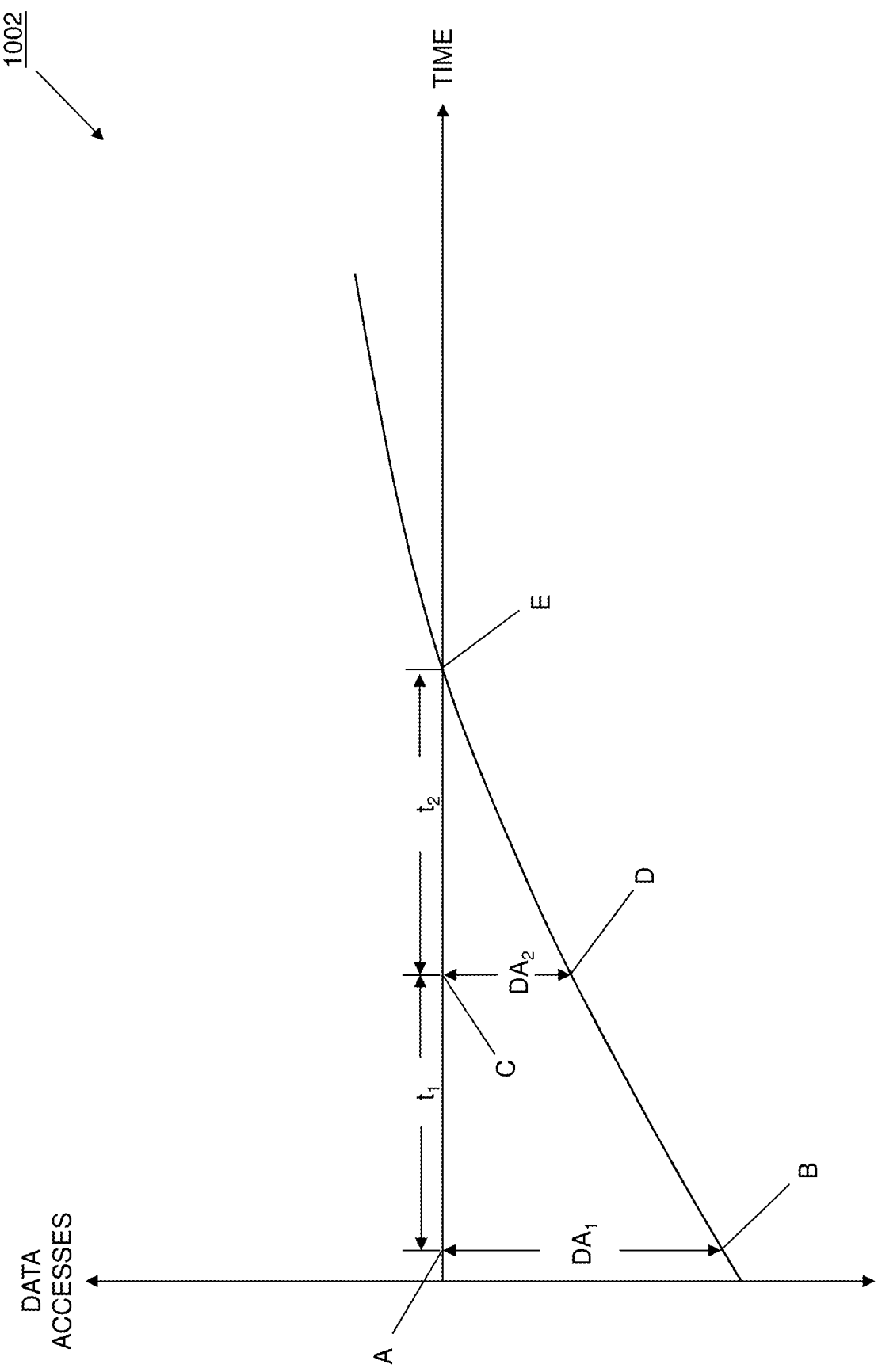
FIG. 10B is a graph view illustrating an embodiment of data access crossing a data access frequency threshold.

With reference to FIG. 10B, a data access frequency graph 1002 for particular data is illustrated to provide an example of a situation where the data access frequency for that particular data is initially below a data access frequency threshold, and then exceeds the data access frequency threshold. As can be seen in FIG. 10B, at a first time A the particular data experienced a number of data accesses $DA_1$ that is below the data access frequency threshold and that is marked on the data access plot at point B, and at a second time C that is a time period $t_1$ following the first time A, the particular data experiences a number of data accesses $DA_2$ that is below the data access frequency threshold and that is marked on the data access plot at point D. Furthermore, at a third time E that is a time period $t_2$ following the second time C, the particular data will experience a number of data accesses that is defined by the data access frequency threshold, and following the third time E, the data access frequency of the particular data will exceed the data access frequency threshold.

As will be appreciated by one of skill in the art in possession of the present disclosure, the number of data accesses $DA_1$ may have been identified by monitoring of the particular data at the first time A, and the number of data accesses $DA_2$ may be identified by the monitoring of the particular data at the second time B that is a known time period $t_1$ (e.g., 1 hour in the specific examples below). The time period $t_2$ then provides the amount of time following the second time B at which the number of data accesses for the particular data will exceed the data access frequency threshold, and can be solved for using the following equation by assuming that the first time A, the third time E, and point B on the data access plot in FIG. 10B form a triangle AEB that is similar a triangle CED formed by the second time C, the third time E, and point D on the data access plot in FIG. 10B:

$$t_2/DA_2=(t_1+t_2)/DA_1$$

Using 1-hour for the time period $t_1$, the equation above may be solved for the time period $t_2$:

$$t_2=DA_2/(DA_1-DA_2)$$

As such, when the time period $t_2$ is less than 1 hour, the number of data accesses for the particular data will exceed the data access frequency threshold in a subsequent time period (e.g., using 1-hour time periods in this example). In other words, at a current time C and following a current time period $t_1$, the time period $t_2$ that will be required for the number of data accesses for any particular data to exceed the data access frequency threshold may be determined. Thus, the data relocation engine 304 in the storage controller device 300 may utilize the equation above at decision block 404 to determine whether the number of data accesses $DA_2$ that are identified in the second time C for any particular data indicates that the number of data accesses of that particular data at the third time E will exceed the data access frequency threshold during the subsequent time period (e.g., 1 hour in this example) that immediately follows the time period $t_1$ (e.g., also 1 hour in this example).

In the specific examples provided above, the determination of whether a first data access frequency for data during a first time period indicates that a second data access frequency for that data will exceed a data access frequency threshold during a second time period that occurs immediately following the first time period is performed in substantially the same manner as the determination of whether a first data access frequency for data during a first time period indicates that a second data access frequency for that data will fall below a data access frequency threshold during a second time period that occurs immediately following the first time period. However, while specific techniques for determining whether a data access frequency for data is about to cross a data access frequency threshold during an immediately subsequent time period have been described, one of skill in the art in possession of the present disclosure will recognize that other techniques for identifying that a data access frequency threshold will be crossed will fall within the scope of the present disclosure as well.

If, at decision block 404, it is determined that the first data access frequency of data during the first time period indicates that the second data access frequency of the data will not cross a data access frequency threshold during the second time period, the method 400 returns to block 402. As such, the method 400 may loop such that the storage controller device 204/300 monitors data stored in the low speed storage device(s) 206, the intermediate speed storage device(s) 208, and the high-speed storage device(s) 210 to identify data access frequencies for that data (and, in some embodiments, store those data access frequencies in the data relocation database 306 for use in subsequent decision block 404 determination operations) as long as no first data access frequency is identified for data that indicates that a second data access frequency for that data will cross the data access frequency threshold in an immediately subsequent time period.

If at decision block 404, it is determined that the first data access frequency of the data during the first time period indicates that the second data access frequency of the data will cross the data access frequency threshold during the second time period, the method 400 proceeds to block 406 where the storage controller device relocates data from the first storage device(s) to second storage device(s). In an embodiment, at block 406 and in response to determining that a first data access frequency for any particular data indicates that a second data access frequency for that data will exceed the data access frequency threshold in an immediately subsequent time period, the data relocation engine 304 in the storage controller device 204/300 may operate to move that data to a higher performance storage device during that subsequent time period (e.g., if that data is stored in the low speed storage device(s) 206, that data may be moved to the intermediate speed storage device(s) 208 or the high speed storage device(s) 210, and if that data is stored in the intermediate speed storage device(s) 208, that data may be moved to the high speed storage device(s) 210).

Similarly, in an embodiment, at block 406 and in response to determining that a first data access frequency for particular data indicates that a second data access frequency for that data will fall below the data access frequency threshold in an immediately subsequent time period, the data relocation engine 304 in the storage controller device 204/300 may operate to move that data to a lower performance storage device (e.g., if that data is stored in the high speed storage device(s) 210, that data may be moved to the intermediate speed storage device(s) 208 or the low speed storage device(s) 206, and if that data is stored in the intermediate speed storage device(s) 208, that data may be moved to the low speed storage device(s) 206).

In some embodiments, the movement of the data in the subsequent time period may be initiated at the beginning of that subsequent time period. In other embodiments, the movement of the data in the subsequent time period may be initiated at the end of that subsequent time period (i.e., when the corresponding data has its data access frequency exceed the data access frequency threshold). In yet other embodiments, the movement of the data in the subsequent time period may be initiated following the time at which the corresponding data has its data access frequency exceed the data access frequency threshold (which may still be part of that subsequent time period). As such, the movement of the data at block 406 may occur (or be initiated) at different times in the subsequent time period, and may depend on the current use of the data. For example, in cases in which the data access frequency of the data is about to exceed the data access frequency threshold, the movement of the data may begin as soon as possible to ensure the higher data access frequency that will occur for that data is performed using the relatively higher speed storage device(s). Similarly, in cases in which the data access frequency of the data is about to fall below the data access frequency threshold, the movement of the data may be delayed due to the ability of the relatively higher speed storage devices to satisfy the impending lower data access frequency that will occur for that data.

Figure 11:
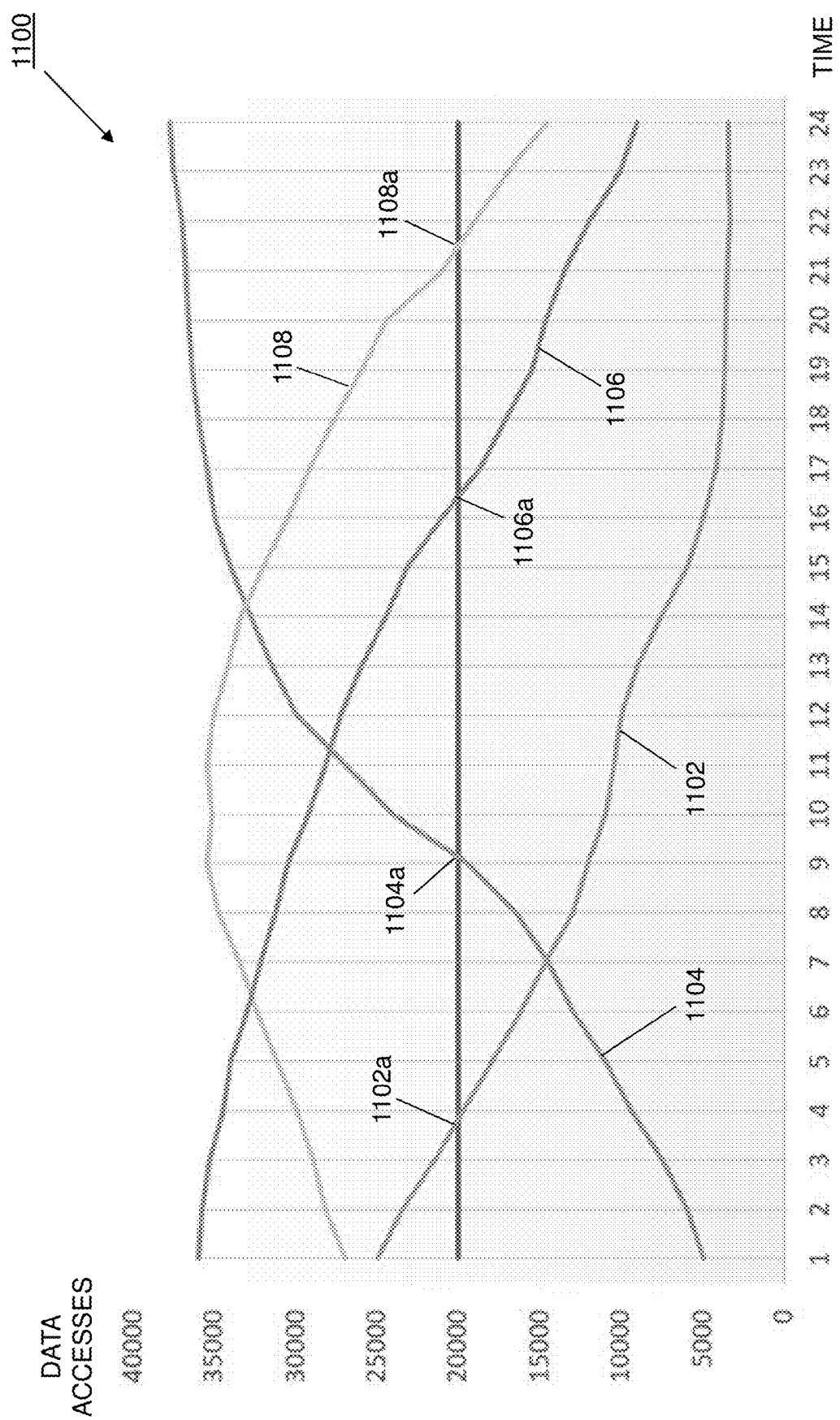
FIG. 11 is a graph view illustrating an embodiment of data access frequencies for a plurality of different data.

With reference to FIG. 11, an embodiment of a data access frequency graph 1100 is provided that illustrates data access frequencies for different data 1102, 1104, 1106, and 1108. As will be appreciated by one of skill in the art in possession of the present disclosure, the data 1102 initially includes a data access frequency that is above a data access frequency threshold (e.g., 20000 data accesses in this example) and that falls below the data access frequency threshold at a time 1102a (approximately hour 4 in this example), the data 1104 initially includes a data access frequency that is below the data access frequency threshold and that exceeds the data access frequency threshold at a time 1104a (approximately hour 9 in this example), the data 1106 initially includes a data access frequency that is above the data access frequency threshold and that falls below the data access frequency threshold at a time 1106a (approximately hour 16.5 in this example), and the data 1108 initially includes a data access frequency that is above the data access frequency threshold and that falls below the data access frequency threshold at a time 1108a (approximately hour 21.5 in this example). As will be appreciated by one of skill in the art in possession of the present disclosure, conventional fixed-time data relocation systems will not provide for the efficient relocation of all the data 1102, 1104, 1106, and 1108.

As such, the storage controller device 204/300 may perform the method 400 for each of the data 1102, 1104, 1106, and 1108, which may result in the relocation of the data 1102 at time 1102a (approximately hour 4 in this example), the relocation of the data 1104 at time 1104a (approximately hour 9 in this example), the relocation of the data 1106 at time 1106a (approximately hour 16.5 in this example), and the relocation of the data 1108 at time 1108a (approximately hour 21.5 in this example). Thus, different data may be relocated at different times, and the relocation of any particular data may be performed during a time period in which the data access frequency of that data crosses a data access frequency threshold. The method 400 then returns to block 402. As such, the method 400 may loop such that different data is moved between the low speed storage device(s) 206, the intermediate speed storage device(s) 208, and the high-speed storage device(s) 210 depending on its data access frequency, and only during time periods in which that data access frequency crosses a data access threshold.

Thus, systems and methods have been described that provide for the relocation of any particular data in response to detecting that the data access frequency of that particular data is about to cross a data access frequency threshold. For example, the data relocation system of the present disclosure may include a storage controller device coupled to first storage device(s) that operate at first data access speeds, and second storage device(s) that operate at second data access speeds that are higher than the first data access speeds. During a first time period, the storage controller device monitors first data that is stored in the first storage device(s) to identify a first data access frequency for the first data, and determines that the first data access frequency for the first data during the first time period indicates that a second data access frequency for the first data will exceed a data access frequency threshold during a second time period that occurs immediately following the first time period. In response and during the second time period, the storage controller device relocates the first data from the first storage device(s) to the second storage device(s). As such, the systems and methods of the present disclosure operate to relocate different data at different times, with any particular data relocated when its data access frequency is about to cross a data access frequency threshold, which operates to increase the efficiency of data relocation operations, prevent the interruption of data access for users in datacenters with a global user base, prevent internal I/O load peaks/relocation workload pulses that would otherwise affect data access for users, and provide other benefits that would be apparent to one of skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A data relocation system, comprising:
   at least one first storage device that is configured to operate at first data access speeds;
   at least one second storage device that is configured to operate at second data access speeds that are higher than the first data access speeds; and
   a storage controller device that is coupled to each of the at least one first storage device and the at least one second storage device, wherein the storage controller device is configured to:
      monitor, during a first time period, first data that is stored in the at least one first storage device to identify a first data access frequency for the first data that does not exceed a data access frequency threshold;
      determine that the first data access frequency for the first data during the first time period indicates that a second data access frequency for the first data will exceed the data access frequency threshold during a second time period that occurs immediately following the first time period; and
      relocate, during the second time period and in response to determining the first data access frequency for the first data during the first time period indicates that the second data access frequency for the first data will exceed the data access frequency threshold during the second time period that occurs immediately following the first time period, the first data from the at least one first storage device to the at least one second storage device.

2. The system of claim 1, wherein the first time period is equal to the second time period.

3. The system of claim 1, wherein the storage controller device is configured to:
   monitor, during a third time period, second data that is stored in the at least one second storage device to identify a third data access frequency for the second data that does not exceed the data access frequency threshold;
   determine that the third data access frequency for the second data during the third time period indicates that a fourth data access frequency for the second data will be below the data access frequency threshold during a fourth time period that occurs immediately following the third time period; and
   relocate, during the fourth time period and in response to determining the third data access frequency for the second data during the third time period indicates that the fourth data access frequency for the second data will be below the data access frequency threshold during the fourth time period that occurs immediately following the third time period, the second data from the at least one second storage device to the at least one first storage device.

4. The system of claim 3, wherein the second time period is different than the fourth time period.

5. The system of claim 1, further comprising:
   at least one third storage device that is configured to operate at third data access speeds that are higher than the second data access speeds, wherein the storage controller device is configured to:
      monitor, during a third time period, second data that is stored in the at least one second storage device to identify a third data access frequency for the second data that does not exceed the data access frequency threshold;
      determine that the third data access frequency for the second data during the third time period indicates that a fourth data access frequency for the second data will exceed the data access frequency threshold during a fourth time period that occurs immediately following the third time period; and
      relocate, during the fourth time period and in response to determining the third data access frequency for the second data during the third time period indicates that the fourth data access frequency for the second data will exceed the data access frequency threshold during the fourth time period that occurs immediately following the third time period, the second data from the at least one second storage device to the at least one third storage device.

6. The system of claim 1, wherein the storage controller device is configured to:
   determine that the first data access frequency for the first data during the first time period indicates that the second data access frequency for the first data will exceed the data access frequency threshold at a first time that occurs during the second time period; and
   relocate the first data from the at least one first storage device to the at least one second storage device at the first time.

7. An Information Handling System (IHS), comprising:
   a processing system; and
   a memory system that is coupled to the processing system and that includes instructions that, when executed by the processing system, cause the processing system to provide a data relocation engine that is configured to:
      monitor, during a first time period, first data that is stored in at least one first storage device that is configured to operate at first data access speeds to identify a first data access frequency for the first data that does not exceed a data access frequency threshold;
      determine that the first data access frequency for the first data during the first time period indicates that a second data access frequency for the first data will exceed the data access frequency threshold during a second time period that occurs immediately following the first time period; and
      relocate, during the second time period and in response to determining the first data access frequency for the first data during the first time period indicates that the second data access frequency for the first data will exceed the data access frequency threshold during the second time period that occurs immediately following the first time period, the first data from the at least one first storage device to at least one second storage device that is configured to operate at second data access speeds that are higher than the first data access speeds.

8. The IHS of claim 7, wherein the first time period is equal to the second time period.

9. The IHS of claim 7, wherein the data relocation engine is configured to:
   monitor, during a third time period, second data that is stored in the at least one second storage device to identify a third data access frequency for the second data that does not exceed the data access frequency threshold;
   determine that the third data access frequency for the second data during the third time period indicates that a fourth data access frequency for the second data will be below the data access frequency threshold during a fourth time period that occurs immediately following the third time period; and relocate, during the fourth time period and in response to determining the third data access frequency for the second data during the third time period indicates that the fourth data access frequency for the second data will be below the data access frequency threshold during the fourth time period that occurs immediately following the third time period, the second data from the at least one second storage device to the at least one first storage device.

10. The IHS of claim 9, wherein the second time period is different than the fourth time period.

11. The IHS of claim 7, wherein the data relocation engine is configured to:

monitor, during a third time period, second data that is stored in the at least one second storage device to identify a third data access frequency for the second data that does not exceed the data access frequency threshold;

determine that the third data access frequency for the second data during the third time period indicates that a fourth data access frequency for the second data will exceed the data access frequency threshold during a fourth time period that occurs immediately following the third time period; and relocate, during the fourth time period and in response to determining the third data access frequency for the second data during the third time period indicates that the fourth data access frequency for the second data will exceed the data access frequency threshold during the fourth time period that occurs immediately following the third time period, the second data from the at least one second storage device to at least one third storage device that is configured to operate at third data access speeds that are higher than the second data access speeds.

12. The IHS of claim 11, wherein the second time period is different than the fourth time period.

13. The IHS of claim 7, wherein the data relocation engine is configured to:

determine that the first data access frequency for the first data during the first time period indicates that the second data access frequency for the first data will exceed the data access frequency threshold at a first time that occurs during the second time period; and relocate the first data from the at least one first storage device to the at least one second storage device at the first time.

14. A method for relocating data, comprising:

monitoring, by a storage controller device during a first time period, first data that is stored in at least one first storage device that is configured to operate at first data access speeds to identify a first data access frequency for the first data that does not exceed a data access frequency threshold;

determining, by the storage controller device, that the first data access frequency for the first data during the first time period indicates that a second data access frequency for the first data will exceed the data access frequency threshold during a second time period that occurs immediately following the first time period; and relocating, by the storage controller device during the second time period and in response to determining the first data access frequency for the first data during the first time period indicates that the second data access frequency for the first data will exceed the data access frequency threshold during the second time period that occurs immediately following the first time period, the first data from the at least one first storage device to at least one second storage device that is configured to operate at second data access speeds that are higher than the first data access speeds.

15. The method of claim 14, wherein the first time period is equal to the second time period.

16. The method of claim 14, further comprising:

monitoring, by the storage controller device during a third time period, second data that is stored in the at least one second storage device to identify a third data access frequency for the second data that does not exceed the data access frequency threshold;

determining, by the storage controller device, that the third data access frequency for the second data during the third time period indicates that a fourth data access frequency for the second data will be below the data access frequency threshold during a fourth time period that occurs immediately following the third time period; and relocating, by the storage controller device during the fourth time period and in response to determining the third data access frequency for the second data during the third time period indicates that the fourth data access frequency for the second data will be below the data access frequency threshold during the fourth time period that occurs immediately following the third time period, the second data from the at least one second storage device to the at least one first storage device.

17. The method of claim 16, wherein the second time period is different than the fourth time period.

18. The method of claim 14, further comprising:

monitoring, by the storage controller device during a third time period, second data that is stored in the at least one second storage device to identify a third data access frequency for the second data that does not exceed the data access frequency threshold;

determining, by the storage controller device, that the third data access frequency for the second data during the third time period indicates that a fourth data access frequency for the second data will exceed the data access frequency threshold during a fourth time period that occurs immediately following the third time period; and relocating, by the storage controller device during the fourth time period and in response to determining the third data access frequency for the second data during the third time period indicates that the fourth data access frequency for the second data will exceed the data access frequency threshold during the fourth time period that occurs immediately following the third time period, the second data from the at least one second storage device to at least one third storage device that is configured to operate at third data access speeds that are higher than the second data access speeds.

19. The method of claim 18, wherein the second time period is different than the fourth time period.

20. The method of claim 14, further comprising:

determining, by the storage controller device, that the first data access frequency for the first data during the first time period indicates that the second data access frequency for the first data will exceed the data access frequency threshold at a first time that occurs during the second time period; and relocating, by the storage controller device, the first data from the at least one first storage device to the at least one second storage device at the first time.

\* \* \* \* \*